United States Patent
Rametta

(10) Patent No.: US 8,462,561 B2
(45) Date of Patent: Jun. 11, 2013

(54) SYSTEM AND METHOD FOR INTERFACING BURST MODE DEVICES AND PAGE MODE DEVICES

(75) Inventor: Dean Anthony Rametta, Glastonbury, CT (US)

(73) Assignee: Hamilton Sundstrand Corporation, Windsor Locks, CT (US)

(*) Notice: Subject to any disclaimer, the term of this patent is extended or adjusted under 35 U.S.C. 154(b) by 134 days.

(21) Appl. No.: 13/197,172

(22) Filed: Aug. 3, 2011

(65) Prior Publication Data

US 2013/0033945 A1    Feb. 7, 2013

(51) Int. Cl.
G11C 7/00 (2006.01)
G11C 8/00 (2006.01)

(52) U.S. Cl.
USPC ............ 365/189.05; 365/189.15; 365/189.17; 365/233.1; 365/233.17; 365/233.18; 365/236; 365/238.5

(58) Field of Classification Search
USPC ............... 365/189.05, 189.15, 189.17, 233.1, 365/233.17, 233.18, 236, 238.5
See application file for complete search history.

(56) References Cited

U.S. PATENT DOCUMENTS

| | | | | |
|---|---|---|---|---|
| 5,590,078 | A | * | 12/1996 | Chatter ..................... 365/233.1 |
| 5,901,304 | A | * | 5/1999 | Hwang et al. ............ 365/189.05 |
| 6,047,361 | A | | 4/2000 | Ingenio et al. |
| 6,449,193 | B1 | * | 9/2002 | Love et al. ............... 365/230.01 |
| 6,564,285 | B1 | | 5/2003 | Mills et al. |
| 7,843,742 | B2 | * | 11/2010 | Sunaga et al. ........... 365/189.05 |
| 8,223,562 | B2 | * | 7/2012 | Hung et al. ................ 365/233.1 |
| 2004/0052124 | A1 | | 3/2004 | Sudo et al. |
| 2006/0224789 | A1 | | 10/2006 | Cho et al. |
| 2009/0201735 | A1 | | 8/2009 | Park |
| 2010/0027329 | A1 | | 2/2010 | Lee et al. |

FOREIGN PATENT DOCUMENTS

EP    1443519 B1    11/2007
WO    WO2011137541 A1    11/2011

OTHER PUBLICATIONS

The Search Report of counterpart Great Britian App. No. GB1211758.6 filed Jul. 3, 2012.

* cited by examiner

Primary Examiner — Trong Phan
(74) Attorney, Agent, or Firm — Kinney & Lange, P.A.

(57) ABSTRACT

A burst read control circuit acts as an interface to allow a burst-read capable device to execute burst reads from a page-mode capable memory device. The burst read control circuit coordinates burst read requests from the burst-read capable device and subsequent responses from the page-mode capable memory device by accessing subsequent and contiguous memory locations of the page-mode capable memory device.

14 Claims, 1 Drawing Sheet

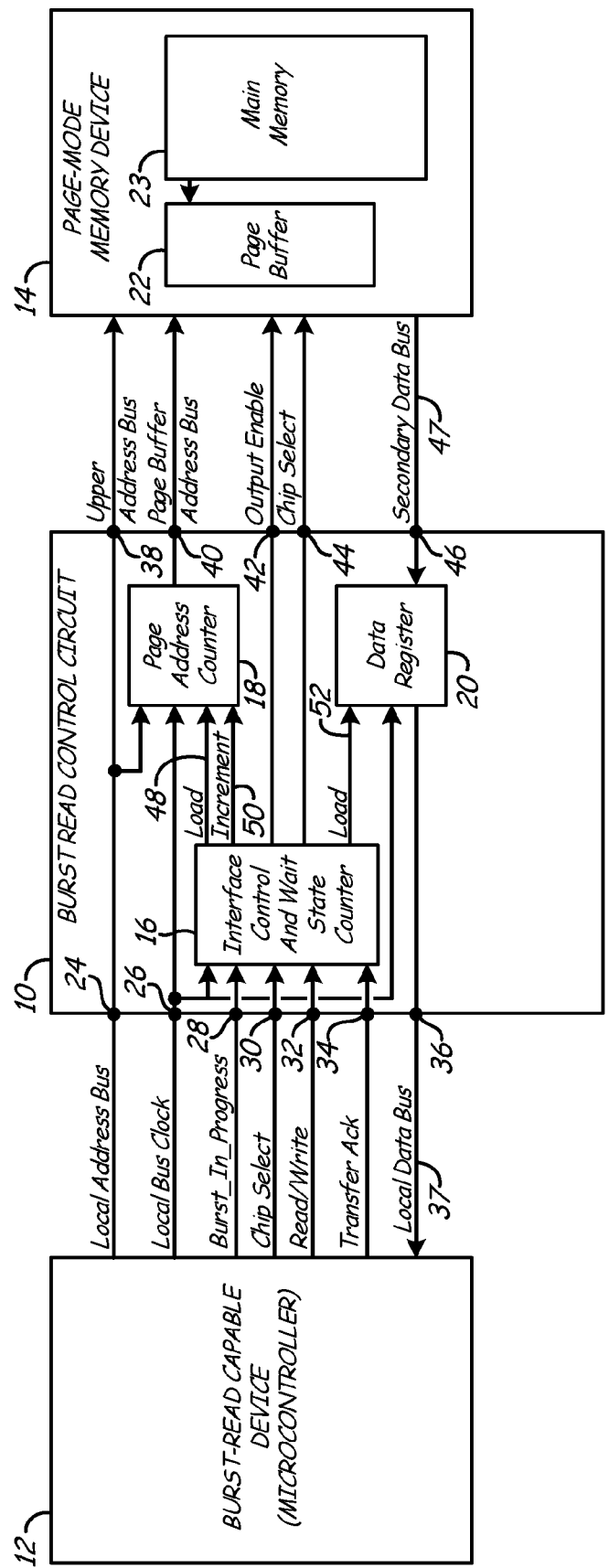

SYSTEM AND METHOD FOR INTERFACING BURST MODE DEVICES AND PAGE MODE DEVICES

BACKGROUND

The present invention is related to computer systems, and in particular to data transfer between devices.

In a number of applications, microprocessors or microcontrollers operate by executing software stored in external memory. The speed at which the microcontroller can access software stored in the external memory determines, in part, the performance of the microcontroller. For example, a microcontroller may have to execute a plurality of individual read operations from external memory in order to execute an application. The time associated with reads to the external memory therefore affects the overall performance of the microcontroller. To minimize the time required to read from external memory, some devices support burst transfers, in which a burst read request results in the external memory providing not only the data associated with the address provided as part of the data burst read request but also data associated with subsequent and contiguous addresses. Although data retrieved with respect to the address provided as part of the data burst read request requires the same amount of time as a single data read request, data reads associated with subsequent and contiguous addresses are performed more quickly.

However, not all memory devices support data burst read requests. For example, most flash memory devices do not support data burst read operations. In applications utilizing flash memory devices, the benefits associated with data burst reads are unrealized.

SUMMARY

A data transfer system includes a burst-read capable device, a page mode memory device and a burst read control circuit. The burst-read capable device initiates a burst read request that includes a first memory address location and is connected to receive data via a local data bus. The page mode memory device includes a main memory portion and a page buffer portion. The page mode memory device provides data from the main memory portion in response to a received address and data from the page buffer portion in response to a received page buffer address. The burst read control circuit interfaces between the burst-read capable device and the page mode memory. In response to the burst-read capable device initiating a burst read request the burst read control circuit communicates the first memory address location to the page mode memory device to read data associated with the first memory address location and to load data associated with addresses contiguous within the device's page buffer portion. The burst read control circuit automatically increments a page buffer address provided to the page mode memory to retrieve data from the page mode memory for provision to the burst-read capable device.

BRIEF DESCRIPTION OF THE DRAWINGS

The FIGURE is a block diagram of an interface circuit that interfaces a burst-read capable device with a page-mode memory device.

DETAILED DESCRIPTION

The present invention provides a page mode to burst mode interface that allows a burst-read capable device to execute burst reads from a page-mode memory device. A burst read control circuit acts as the interface between the burst-read capable device and the page-mode capable memory device, to coordinate burst read requests from the burst-read capable device and subsequent responses from the page-mode capable memory device. The term "burst read" refers to a situation in which in response to an advance signal a device transmits data from a plurality of contiguous addresses. A burst-read capable device makes a burst read request and receives, in response, data associated with a plurality of contiguous memory addresses. A burst-read memory device receives a burst read request from an initial address, and delivers data associated with multiple memory addresses without requiring further address input from the burst-read capable device.

The FIGURE is a block diagram of burst read control circuit 10 connected between burst-read capable device (e.g., microprocessor, microcontroller) 12 and page-mode memory device (e.g., Flash memory) 14. Burst read control circuit 10 includes interface control and wait state counter 16, page address counter 18, and data register 20. In one embodiment, burst read control circuit 10 is implemented with a programmable logic device, an application specific integrated circuit (ASIC), or field programmable gate array (FPGA). A benefit of utilizing FPGAs or other programmable circuits is that they may be programmed based on the type of burst read implemented by a particular burst-read capable device 12 (referred to hereinafter simply as "microcontroller 12"). For example, one microcontroller may implement a burst read operation by reading four consecutive addresses, while another microcontroller may implement a burst read operation by reading eight consecutive addresses.

Page-mode memory device 14 includes page buffer 22 and main memory 23. Main memory 23 stores all data associated with page-mode memory device 14, wherein page buffer 22 is smaller and is used to temporarily store data from main memory 23 for faster access. Subsequent read operations from page buffer 22 are faster than read operations from main memory 23. However, page-mode memory device 14 does not support burst read operations.

In the embodiment shown in the FIGURE, burst read operations are implemented with respect to page-mode memory device 14 via burst read control circuit 10, which takes advantage of page buffer 22 associated with page-mode memory device 14 to provide burst read operations without modification to either microcontroller 12 (which requests the burst read) or page-mode memory device 14.

In the embodiment shown in the FIGURE, burst read control circuit 10 includes a plurality of inputs/outputs for communicating with microcontroller 12, including local address input 24, local bus clock input 26, burst read input 28, chip select input 30, read/write input 32, transfer acknowledge input 34, and local data output 36. Communications between microcontroller 12 and burst read control circuit 10 are synchronous (i.e., activity coordinated between microcontroller 12 and burst read control circuit by a shared clock provided via local bus clock input 26). During a read operation, microcontroller 12 provides burst read control circuit 10 with address information via local address input 24. Microcontroller 12 dictates whether the read operation is a normal read operation or a burst read operation via instructions provided to burst read input 28, and selects a chip with which to communicate via chip select input 30 (which allows microcontroller 12 to select between one of a plurality of devices, if present). Microcontroller 12 provides instructions to read/write input 32 to dictate whether a read or write operation is being performed, and acknowledges completion of the read/ write operation via instructions provided to transfer acknowledge input 34. Burst read control circuit 10 provides data received from page-mode memory device 14 to microcontroller 12 via local data output 36 and local data bus 37. In the embodiment shown in the FIGURE, local data bus 37 is a synchronous data bus, meaning data is communicated between microcontroller 12 and burst read control circuit 10 according to a shared clock (e.g., provided via local bus clock input 26).

In the embodiment shown in the FIGURE, burst read control circuit 10 includes a plurality of inputs/outputs for communicating with page-mode memory device 14, including upper address output 38, page buffer address output 40, output enable output 42, chip select output 44, and data bus input/output 46. Burst read control circuit 10 communicates upper address information received from microcontroller 12 at local address input 24 to page-mode memory device 14 via upper address output 38. In one embodiment, upper address information provided via upper address output 38 represents the most significant (i.e., higher) bits associated with the address provided via the local address bus. The page buffer address provided via page buffer address output 40 may be comprised of least significant (i.e., lower) bits. The address provided to page-mode memory device 14 via upper address output 38 and via page buffer address bus 40 is used to select a particular address location within memory device 14. Data associated with the particular address location, as well as data associated with contiguous address locations, are loaded into page buffer portion 22. Data stored in page buffer portion 22 will not necessarily start at the first address location in page buffer portion 22, but may start at any location within page buffer portion 22 with data associated with subsequent and contiguous address locations being wrapped around within page buffer portion 22. For example, for the case in which the least significant bits of the address provided via page buffer address bus 40 is '01', then subsequent and contiguous address locations as stored in page buffer portion 22 would include addresses '10', '11' and '00'. In this way, subsequent and contiguous address bits may wrap-around the end of page buffer portion 22.

Burst read control circuit 10 provides an output enable signal via output enable output 42 that enables read/write operations to page-mode memory device 14. Burst read control circuit 10 provides a chip select signal (derived from the chip select signal provided by microcontroller 12 to chip select input 30) to page-mode memory device 14 via chip select output 44 to select a particular memory device in applications in which page-mode memory device 14 includes a plurality of memory devices. Burst read control circuit 10 receives data read from page-mode memory device 14 (i.e., either read from main memory 23 or page buffer 22) and provides data to be written to page-mode memory device 14 via data bus input/output 46. In one embodiment, secondary data bus 47 is an asynchronous data bus that communicates data between burst read control circuit 10 and page-mode memory device 14 asynchronously (i.e., without the benefit of a shared clock signal). As discussed in more detail below, burst read control circuit 10 reconciles differences between local, synchronous, data bus 37 and secondary, asynchronous data bus 47.

During both burst read operations and page-mode read operations, microcontroller 12 provides a first address location burst read control circuit 10 via local address input 24 of burst read control circuit 10. To initiate a burst read operation, microcontroller 12 sends a burst_in_process signal that is received at burst read input 28. The first address location provided by microcontroller 12 is communicated by burst read control circuit 10 to page-mode memory device 14 via upper address output 38 and page buffer address output 40. In response to the provided first address location, page-mode memory device 14 retrieves data associated with the provided address from main memory 23, and communicates the data to burst read control circuit 10 via data bus input/output 46. This operation is the same for both burst read operations and normal read operations. In addition, page-mode memory device 14 loads data associated with contiguous memory locations into page buffer portion 22. Burst read control circuit 10 takes advantage of the page mode capabilities of page-mode memory device 14 to emulate burst-like functionality without requiring modification to microcontroller 12 or page-mode memory device 14.

Burst read control circuit initiates subsequent read operations from page buffer 22 to emulate a burst read operation from the perspective of microcontroller 12. In particular, at least a portion of the first address location (i.e., lower portion of the address) provided via local address input 24 is provided to and stored by page address counter 18 within burst read control circuit 10. Interface control and wait state counter 16 provides a load signal via load line 48 to page address counter 18 to latch or capture the portion of the first address location. Interface control and wait state counter 16 increments the address stored in page address counter 18 via increment line 50 to access subsequent and contiguous memory locations within page buffer 22. The address stored in page address counter 18 is communicated to page-mode memory device 14 to access data stored in page buffer 22. Data retrieved from page buffer 22 is communicated to data bus input/output 46 for storage to data register 20, and then communicated via local data bus input/output 36 to microcontroller 12.

Interface control and wait state counter 16 increments the address stored in page address counter 18 after a defined wait time that allows previously retrieved data to be communicated to microcontroller 12. At the end of a defined wait time, interface control and wait state counter 16 automatically provides an increment signal via increment line 50 to increment the address stored in page address counter 18. In some instances, the initial value stored by page address counter 18 is not the first address of the range (i.e., '00'). During the burst operation, page address counter 18 may be incremented to a maximum value, with the next increment causing page address counter 18 to wrap-around to an initial value (e.g., '00'). The number of increments provided by interface control and wait state counter 16 is determined based on the number of reads expected by microcontroller 12 as part of a burst read operation. In this way, burst read control circuit 10 automatically implements burst-mode requests made by microcontroller 12 to page-mode memory device 14.

In the embodiment shown in the FIGURE, interface control and wait state counter 16 also coordinates communication between microcontroller 12, which operates on a synchronous data bus in which data is communicated and latched via a common clock signal provided by local bus clock line 26, and page-mode memory device 14, which operates asynchronously to retrieve and transmit data. In particular, interface control and wait state counter 16 provides a load command signal via load line 52 to latch or store data provided via data bus 46 by page-mode memory device 14 into data register 20. Data is transferred synchronously from data register 20 to microcontroller 12 via local data bus input/output 36.

Burst read control circuit 10 therefore provides an interface between a burst mode capable device, such as a microcontroller, and a page-mode memory device to implement burst mode operations. In one embodiment, the present invention takes advantage page mode read capabilities of the page-mode memory device to implement the burst mode operation. In this way, the burst read control circuit acts to interface page mode devices with burst mode devices.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A data transfer system comprising:
a burst-read capable device that initiates a burst read request that includes a first memory address location and is connected to receive data via a local data bus;
a page mode memory device that includes a main memory portion and a page buffer portion, wherein the page mode memory device provides data from the main memory portion in response to a received memory location address and data from the page buffer portion in response to a received page buffer address; and
a burst read control circuit that interfaces between the burst-read capable device and the page-mode memory, wherein in response to the burst-read capable device initiating a burst read request the burst read control circuit communicates the first memory address location to the page mode memory device to read data associated with the first memory address location and to load data associated with subsequent and contiguous memory locations into the page buffer portion of the page mode memory device, the burst read control circuit automatically increments and provides a page buffer address to the page mode memory to retrieve data from the page buffer portion for provision to the burst-read capable device.

2. The data transfer system of claim 1, wherein the burst read control circuit includes:
a page address counter that stores at least a portion of the first memory address location received from the burst-read capable device that is provided as a page buffer address to the page mode memory device; and
an interface control and wait state counter that automatically increments the page address counter to generate incremented page buffer addresses for provision to the page mode memory.

3. The data transfer system of claim 2, wherein the interface control and wait state counter automatically increments that page address counter at a predetermined interval of time.

4. The data transfer system of claim 3, wherein the number of increments provided by the interface control and wait state counter corresponds with the burst-read expectation of the burst-read capable device.

5. The data transfer system of claim 1, wherein the burst read control circuit includes:
a data register connected to receive and store data provided by the page mode memory device and to provide the stored data to the burst-read capable device.

6. The data transfer system of claim 5, wherein the data register receives data asynchronously from the page mode memory device and provides data synchronously to the burst-read capable device.

7. The data transfer system of claim 1, wherein the burst read control circuit is a programmable logic device, an application specific integrated circuit (ASIC), or field programmable gate array (FPGA).

8. A burst read control circuit for interfacing between a burst-read capable device and a page-mode memory device, the burst read control circuit comprising:
a local address bus input that receives a first address location from the burst-read capable device;
a burst read input that receives a burst_in_process signal from the burst-read capable device regarding whether to implement a burst read or normal read;
a local data bus output that transmits data received from the page-mode memory device to the burst read capable device;
an upper address bus output that provides at least a portion of the first address location received from the burst-read capable device to the page-mode memory to access data stored in a main memory portion of the page-mode memory device;
a page buffer address bus output that provides page address locations generated by the burst read control circuit to the page-mode memory device to access data stored to a page buffer portion of the page mode memory device;
a page address counter that receives and stores at least a portion of the first address location to generate a page address location, and subsequently receives an increment input to increment the stored page address location; and
an interface control and wait state counter that automatically generates the increment provided to the page address counter when the burst_in_process signal is received from the burst-read capable device to automatically read memory locations subsequent to and contiguous with the first address location provided by the burst-read capable device.

9. The burst read control circuit of claim 8, wherein the number of increments provided by the interface control and wait state counter corresponds with the burst-read expectation of the burst-read capable device.

10. The burst read control circuit of claim 8, further including:
a data register connected to receive and store data provided by the page mode memory device and to provide the stored data to the burst-read capable device.

11. The burst read control circuit of claim 10, wherein the data register receives data asynchronously from the page mode memory device and provides data synchronously to the burst-read capable device.

12. The burst read control circuit of claim 8, wherein the burst read control circuit is a field programmable gate array (FPGA).

13. A method of interfacing a burst-mode capable device with a page mode memory device that includes a main memory portion and a page buffer portion, the method comprising:
receiving a burst-mode read request from the burst-mode capable device that includes a first address location;
storing at least a portion of the first address location to a page address counter;
providing the first address location to the page mode memory device to access data stored in the main memory portion associated with the first address location and to load data associated with subsequent and contiguous memory locations into the page buffer portion of the page-mode memory device from the main memory portion;

providing accessed data associated with the first address location to the burst-mode capable device;
incrementing the page address counter;
providing the incremented address location stored in the page address counter to the page-mode memory device to access data stored in the page buffer portion; and
providing accessed data associated with subsequent and contiguous memory locations stored in the page buffer to the burst-mode capable device.

14. The method of claim 13, wherein storing at least a portion of the first address location to the page address counter includes storing lower address bits of the first address location to the page address counter.

* * * * *